Patented Dec. 30, 1930

1,787,205

UNITED STATES PATENT OFFICE

OSKAR LOEHR, OF UERDINGEN, NIEDERRHEIN, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

PRODUCTION OF ALCOHOLS

Application filed June 1, 1928, Serial No. 282,282, and in Germany June 7, 1927.

The invention relates to the production of alcohols and particularly comprises a process of making primary alcohols by catalytically hydrogenating olefine oxides.

I have found that olefine oxides of primary structure which correspond to the general formula:

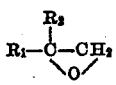

wherein $R_1$ stands for an alkyl or aryl residue and $R_2$ for a hydrogen atom or alkyl, aryl or aralkyl group are readily converted into primary alcohols by treating them with hydrogen in the presence of certain catalysts. This reaction is effected by all hydrogenation catalysts and in addition to copper, especially metals of the eighth group of the periodical system such as nickel, cobalt, iron, platinum, palladium etc. in a finely divided state have proved very useful. These catalysts may be used singly or mixed with each other or they may be precipitated upon an inert substance or carrier such as pumice, calcium carbonate, silica gel, charcoal and the like. The catalytic effect produced by the aforesaid substances may be considerably enhanced by the admixture with the catalyst of small quantities of other substances acting as promoters; for example a catalyst more efficacious than pure nickel is obtained by adding small quantities of alkaline acting agents to a precipitate of nickel hydroxide before reducing it to nickel metal. An analogous effect is obtained by the addition of small amounts of aluminium oxide or thorium dioxide.

The hydrogenating process may be carried out in accordance with the well known methods of hydrogenating organic compounds. It depends upon the olefine oxide used as the starting material and the catalyst and apparatus employed whether the hydrogenation takes place in the vapor or liquid phase as well as whether it is effected under normal or super-atmospheric pressure. In all cases, however, the hydrogenation temperature which is influenced by the catalyst and may vary within certain limits is carefully so selected as to prevent any decomposition of the olefine oxide and the alcohol resulting therefrom.

It is to be understood that not only pure olefine oxides of primary structure but also mixtures of these oxides with olefine oxides of secondary or tertiary structure or other substances may be subjected to the hydrogenating process.

My invention is illustrated by the following examples but is not restricted thereto (the parts are by weight):

Example 1

A catalyst is prepared by precipitating a solution of 291 parts of nickel nitrate in 5000 parts of water by means of 80 parts of sodium hydroxide, decanting, filtering, washing at first with water until the last traces of nitrate ion have disappeared, and then with a 0,1 percent caustic soda solution and drying the alkaline acting precipitate at about 100° C. The dry precipitate is introduced into a tube, reduced with pure hydrogen at 250 to 300° C. to nickel metal and then a mixture of hydrogen and the vapors of propylene oxide is passed over the catalyst at about 170° C. The products of reaction are condensed in a receiver. The unchanged propylene oxide is distilled off and again passed through the tube, while the residue (35 to 40 percent) consists of n-propyl alcohol.

A cobalt catalyst which is obtained by reducing an alkaline cobalt hydroxide at 400° C. also yields n-propyl alcohol upon passing hydrogen and the vapors of phopylene oxide thereover at about 250° C.

Example 2

A catalyst is prepared by boiling 291 parts of nickel nitrate dissolved in 5000 parts of water with 400 parts of calcium carbonate until all the nickel is precipitated, decanting, filtering, washing and drying the precipitate at about 100° C. A subsequent reduction with pure hydrogen at 250 to 300° C. yields a very finely divided nickel, over which as in Example 1 pure hydrogen and the vapors of a mixture of α-and β-butylene oxide (boiling from 53 to 60° C.) is passed at 170 to 180° C. The condensed reaction product is distilled and yields in addition to 20 percent of unchanged butylene oxide a mixture of (about 55 percent) secondary butyl-alcohol (b. p. 99° C.) and (about 25 percent) n-butyl-alcohol (b. p. 117° C.), which are separated by fractional distillation.

*Example 3*

A catalyst is prepared by precipitating a solution of 483 parts of copper nitrate in 5000 parts of water by means of 160 parts of sodium hydroxide, heating to 100° C. until the precipitate shows a brown black color, decanting, filtering, washing, drying at about 100° C. and reducing the same at 170 to 180° C. As shown in Example 2 a mixture of α- and β-butylene oxide together with pure hydrogen is passed over the catalyst at about 180° C. A yield of about 70 percent of secondary and primary butyl alcohol is obtained.

*Example 4*

A mixture of pure hydrogen and the vapors of styrene oxide (b. p. 188 to 192° C.) is passed at 180° C. over a nickel calcium carbonate catalyst prepared according to Example 2 but containing small quantities of calcium hydroxide. The condensed reaction products contain in addition to unchanged styrene oxide β-phenyl ethyl alcohol. Traces of phenyl acetaldehyde are also present in the mixture. In this case the conditions of hydrogenating as to temperature and rate of the vapor current have to be carefully controlled in order to avoid secondary reactions.

I claim:

1. A process of producing primary alcohols which comprises reacting upon an olefine oxide which corresponds to the general formula:

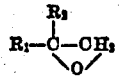

wherein $R_1$ stands for an alkyl or aryl residue and $R_2$ for a hydrogen atom or alkyl, aryl or aralkyl group with hydrogen in the presence of a hydrogenation catalyst.

2. A process of producing primary alcohols which comprises reacting upon an olefine oxide which corresponds to the general formula:

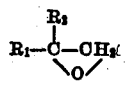

wherein $R_1$ stands for an alkyl or aryl residue and $R_2$ for a hydrogen atom or alkyl, aryl or aralkyl group with hydrogen in the presence of a finely divided metal of the eighth group of the periodical system.

3. A process of producing primary alcohols which comprises reacting upon an olefine oxide which corresponds to the general formula:

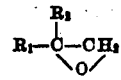

wherein $R_1$ stands for an alkyl or aryl residue and $R_2$ for a hydrogen atom or alkyl, aryl or aralkyl group with hydrogen in the presence of a finely divided nickel.

4. A process of producing primary alcohols which comprises reacting upon an aliphatic olefine oxide which corresponds to the general formula:

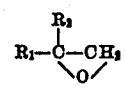

wherein $R_1$ stands for an alkyl residue and $R_2$ for a hydrogen atom or an alkyl group in the presence of a hydrogenation catalyst.

5. A process of producing n-propyl alcohol which comprises reacting upon propylene oxide with hydrogen in the presence of finely divided nickel.

6. A process which comprises reacting upon a mixture of an olefine oxide which corresponds to the general formula:

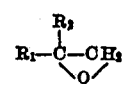

wherein $R_1$ stands for an alkyl or aryl residue and $R_2$ for a hydrogen atom or alkyl, aryl or aralkyl group and other olefine oxides with hydrogen in the presence of a hydrogenation catalyst.

7. A process of producing primary alcohols which comprises reacting upon an olefine oxide which corresponds to the general formula:

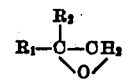

wherein $R_1$ stands for an alkyl or aryl residue and $R_2$ for a hydrogen atom or alkyl, aryl or aralkyl group with hydrogen in the presence of a hydrogenation catalyst and a carrier.

8. A process of producing primary alcohols which comprises reacting upon an olefine oxide which corresponds to the general formula:

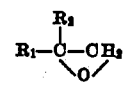

wherein $R_1$ stands for an alkyl or aryl residue and $R_2$ for a hydrogen atom or alkyl, aryl or aralkyl group with hydrogen in the presence of a hydrogenation catalyst and a promoter.

9. A process of producing primary alcohols which comprises reacting upon an olefine oxide which corresponds to the general formula:
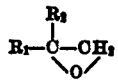
wherein $R_1$ stands for an alkyl or aryl residue and $R_2$ for a hydrogen atom or alkyl, aryl or aralkyl group with hydrogen in the presence of a hydrogenation catalyst, a carrier and a promoter.
In testimony whereof I have hereunto set my hand.
OSKAR LOEHR. [L. S.]